(12) United States Patent
Chen et al.

(10) Patent No.: US 8,716,975 B2
(45) Date of Patent: May 6, 2014

(54) PORTABLE CHARGING DEVICE

(75) Inventors: Jia-Hong Chen, Tu-Cheng (TW);
Yu-Sheng Lin, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 433 days.

(21) Appl. No.: 13/095,918

(22) Filed: Apr. 28, 2011

(65) Prior Publication Data

US 2012/0169277 A1 Jul. 5, 2012

(30) Foreign Application Priority Data

Dec. 29, 2010 (TW) .............................. 99146731 A

(51) Int. Cl.
*H02J 7/00* (2006.01)

(52) U.S. Cl.
USPC ............................. 320/108; 320/109; 320/139

(58) Field of Classification Search
USPC .................... 320/108, 109, 139, 140, 141
See application file for complete search history.

(56) References Cited

U.S. PATENT DOCUMENTS

| | | | | |
|---|---|---|---|---|
| 4,654,573 A * | 3/1987 | Rough et al. | ................... | 320/108 |
| 7,212,420 B2 * | 5/2007 | Liao | ............................... | 363/146 |
| 7,375,494 B2 * | 5/2008 | Daniel et al. | ................... | 320/112 |
| 7,548,040 B2 * | 6/2009 | Lee et al. | ....................... | 320/108 |
| 8,167,633 B1 * | 5/2012 | Wu | ............................... | 439/164 |
| 8,541,975 B2 * | 9/2013 | Park et al. | ...................... | 320/108 |
| 2007/0279002 A1 * | 12/2007 | Partovi | .......................... | 320/115 |
| 2010/0109445 A1 * | 5/2010 | Kurs et al. | ..................... | 307/104 |
| 2010/0308939 A1 * | 12/2010 | Kurs | .......................... | 333/219.2 |

FOREIGN PATENT DOCUMENTS

CN 1256546 A 6/2000

* cited by examiner

*Primary Examiner* — Yalkew Fantu
(74) *Attorney, Agent, or Firm* — Novak Druce Connolly Bove + Quigg LLP

(57) ABSTRACT

A portable charging device includes a case, a power generation module, a storage module, and different types of charging connectors. The power generation module is received in the case, and configured for generating an induced current. The storage module is electrically connected with the power generation module, and configured for storing the induced current generated by the power generation module. The charging connectors are connected to the storage module and protrude from the case for electrically connecting to and charging different types of electronic devices.

8 Claims, 2 Drawing Sheets

PORTABLE CHARGING DEVICE

BACKGROUND

1. Technical Field

The present disclosure relates to charging devices, and particularly, to a portable charging device.

2. Description of Related Art

A person may have many different electronic devices (e.g., notebook computers and mobile phones) each with its own unique charging device. Because the different charging devices are not cross compatible, they must all be brought along on trips, which is inconvenient. What is more, during trips a power source will not always be conveniently at hand and so the electronic devices may run out of power and be useless for periods of time until a user arrives somewhere with available power.

Therefore, it is desirable to provide a portable charging device which can overcome the limitations described.

DETAILED DESCRIPTION

Embodiments of the disclosure will now be described in detail, with reference to the accompanying drawing.

Figure 1:
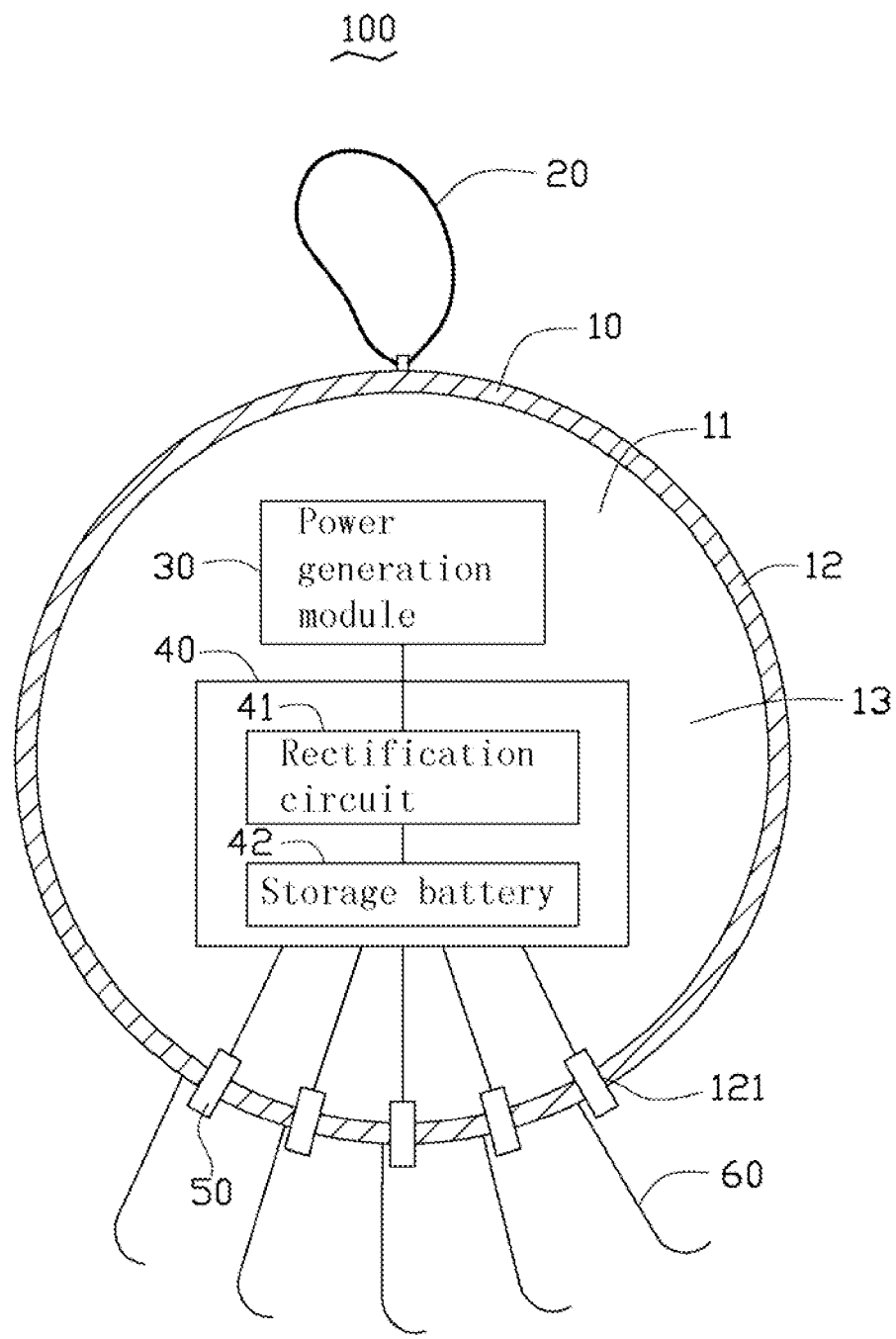
FIG. 1 is a functional block diagram of a portable charging device in accordance with an exemplary embodiment.
Figure 2:
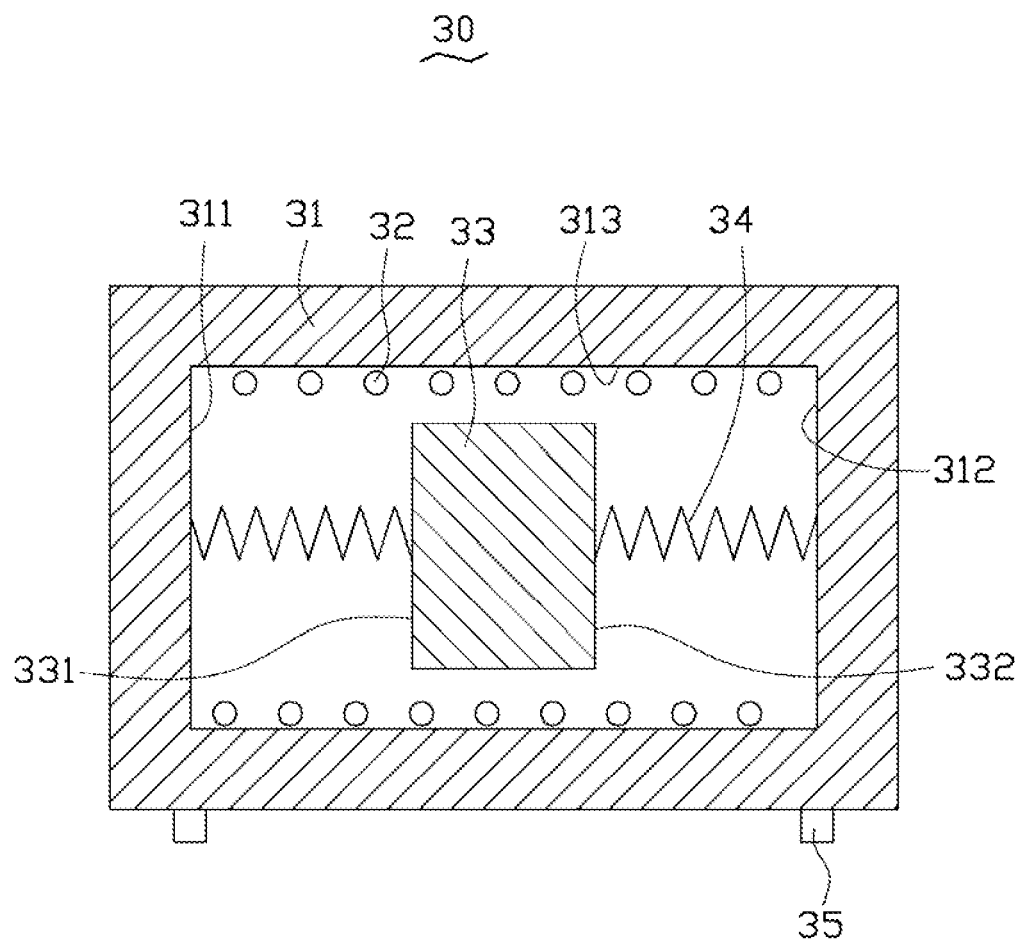
FIG. 2 is a cross-sectional view of a power generation module of the portable charging device of FIG. 1.

Referring to FIGS. 1-2, a portable charging device 100, according to an exemplary embodiment, is configured for charging different electronic devices. The portable charging device 100 includes a case 10, an engaging element 20, a power generation module 30, a storage module 40, a number of charging connectors 50, and a number of key rings 60.

The case 10 is essentially a hollow cylinder, and includes two bottom plates 11 and a side plate 12 connected between the two bottom plates 11. The side plate 12 is perpendicularly positioned at edges of the bottom plates 11. The side plate 12 and the bottom plates 11 cooperatively define a receiving space 13 therebetween. The side plate 12 defines a number of through holes 121 communicating with the receiving space 13. In this embodiment, in order to improve portability, the case 10 is made of light material.

The engaging element 20 is ring-shaped, and fixed on the outer surface of the side plate 12. The engaging element 20 faces away from the through holes 121. The engaging element 20 is used for attaching the portable charging device 100 to a bag or other objects.

The power generation module 30 is received in the receiving space 13, and includes an outer barrel 31, a coil 32, a magnet 33, two springs 34, and two electrical pads 35. The outer barrel 31 is essentially a hollow cylinder, and includes an upper surface 311, a lower surface 312, and an inner surface 313 connected between the upper surface 311 and the lower surface 312. The coil 32 is circular and attached on the inner surface 313. The magnet 33 is cylindrical, and is received in the outer barrel 31. The magnet 33 includes a first end surface 331 facing the upper surface 311 and a second end surface 332 facing the lower surface 312. One spring 34 is connected between the upper surface 311 and the first end surface 331, and the other spring 34 is connected between the lower surface 312 and the second end surface 332. The magnet 33 is suspended in the outer barrel 31. The electrical pads 35 are positioned on the outer surface of the outer barrel 31, and are electrically connected to two ends of the coil 32.

The storage module 40 is received in the receiving space 13, and includes a rectification circuit 41 and a storage battery 42 connected to the rectification circuit 41. The rectification circuit 41 is connected to the electrical pads 35, and configured for modulating current induced by the coil 32 and storing the current in the storage battery 42.

The charging connectors 50 are received in the receiving space 13. One end of each charging connector 50 is electrically connected to the storage battery 42, and the other end protrudes from the corresponding through hole 121. Each charging connector 50 may be a different type of connector, such as a Mini-USB, a Micro-USB, or a USB.

The key rings 60 are positioned on the outer surface of the side plate 12, and each key ring 60 is adjacent to the corresponding through hole 121. The key rings 60 are configured for engaging with keys and other accessories.

When the portable charging device 100 is not in use, the portable charging device 100 can be attached to a user's bag by the engaging element 20. During moving of the portable charging device 100, the magnet 33 of the power generation module 30 moves from right to left in the outer barrel 31. The coil 32 cuts the magnetic lines of the magnet 33, and generates an induced current. The induced current of the coil 32 flows to the rectification circuit 41 through the electrical pads 35. Then, the induced current is modulated by the rectification circuit 41 and stored in the storage battery 42. When an electrical device needs to be charged, the electrical device is connected to one of the charging connectors 50 according to the type of the charging socket of the electrical device.

The portable charging device 100 may further include an alternating charging connector connected to the storage battery 42. The portable charging device 100 can then be charged by alternating current via the alternating charging connector. The alternating current is modulated by the rectification circuit 41 and stored in the storage battery 42.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A portable charging device, comprising:
   a case;
   a power generation module received in the case, and configured for generating an induced current;
   a storage module electrically connected with the power generation module, and configured for storing the induced current generated by the power generation module; and
   a plurality of different types of charging connectors connected with the storage module and protruding from the case for electrically connecting to different types of electronic devices and charging the electronic devices;
   wherein the power generation module comprises an outer barrel, a coil, a magnet, and two springs; the outer barrel comprises an upper surface, a lower surface, and an inner surface; the coil is circled and attached on the inner surface; the magnet comprises a first end surface and a second end surface; one spring is connected between the upper surface and the first end surface, and another spring is connected between the lower surface and the second end surface; the magnet is suspended in the outer barrel.

2. The portable charging device of claim 1, wherein the power generation module further comprises two electrical pads positioned on an outer surface of the outer barrel and respectively electrically connected to two ends of the coil.

3. The portable charging device of claim 2, wherein the storage module comprises a rectification circuit and a storage battery connected with the rectification circuit; the rectification circuit is connected with the electrical pads, and configured for modulating the current induced by the coil and storing the current in the storage battery.

4. The portable charging device of claim 1, wherein the case comprises two bottom plates and a side plate; the side plate is perpendicularly positioned at edges of the bottom plates; the side plate and the bottom plates cooperatively define a receiving space; the power generation module and the storage module are received in the receiving space.

5. The portable charging device of claim 4, wherein the side plate defines a plurality of through holes communicating with the receiving space, the charging connectors protrudes from the case through the through holes.

6. The portable charging device of claim 5, further comprising a plurality of key rings positioned on the case; each key ring adjacent to the corresponding through hole.

7. The portable charging device of claim 1, further comprising an engaging element fixed on the case.

8. The portable charging device of claim 1, wherein the coil cuts the magnetic lines of the magnet during moving of the power generation module, and generates an induced current.

* * * * *